(12) United States Patent
Tung (10) Patent No.: US 11,852,898 B2
(45) Date of Patent: Dec. 26, 2023

(54) FULL FRAME GLASSES (71) Applicant: Yi-Ping Tung, Tainan (TW)

(72) Inventor: Yi-Ping Tung, Tainan (TW)

(*) Notice: Subject to any disclaimer, the term of this patent is extended or adjusted under 35 U.S.C. 154(b) by 259 days.

(21) Appl. No.: 17/490,122

(22) Filed: Sep. 30, 2021

(65) Prior Publication Data

US 2023/0004020 A1   Jan. 5, 2023

(30) Foreign Application Priority Data

Jun. 30, 2021   (TW) .................................. 110207639

(51) Int. Cl.
*G02C 1/04*   (2006.01)
*G02C 5/02*   (2006.01)

(52) U.S. Cl.
CPC .................. *G02C 1/04* (2013.01); *G02C 5/02* (2013.01); *G02C 2200/04* (2013.01)

(58) Field of Classification Search
CPC ........ G02C 1/04; G02C 5/02; G02C 2200/02; G02C 2200/04; G02C 2200/06
See application file for complete search history.

(56) References Cited

U.S. PATENT DOCUMENTS

| | | | | |
|---|---|---|---|---|
| 5,257,050 A * | 10/1993 | Wiedner | .................. | G02C 1/06 351/86 |
| 6,561,647 B1 * | 5/2003 | Chen | ........................ | G02C 1/04 351/103 |
| 7,347,545 B1 * | 3/2008 | Jannard | ..................... | G02C 1/04 351/86 |
| 7,431,451 B1 * | 10/2008 | Lin | ......................... | G02C 5/122 351/138 |
| 7,585,072 B1 * | 9/2009 | Wang-Lee | ............... | G02C 5/12 351/138 |
| 8,777,403 B2 * | 7/2014 | Huang | ..................... | G02C 1/04 351/86 |
| 9,958,702 B1 * | 5/2018 | Chen | ....................... | G02C 5/126 |
| 10,459,244 B1 * | 10/2019 | Tsai | ......................... | G02C 1/10 |
| 10,928,646 B2 * | 2/2021 | Chen | ........................ | G02C 1/10 |

(Continued)

FOREIGN PATENT DOCUMENTS

| AU | 2013100849 A4 * | 7/2013 | ............... G02C 1/08 |
|---|---|---|---|
| DE | 20118002 U1 * | 2/2002 | ............... G02C 1/06 |
| KR | 20110049534 A * | 5/2011 | |

(Continued)

*Primary Examiner* — Christopher Stanford
(74) *Attorney, Agent, or Firm* — Rosenberg, Klein & Lee (57) ABSTRACT

A pair of full frame glasses is revealed. A through hole and a mounting fixing hole are penetrating an upper frame portion and a lower frame portion of a frame respectively while an upper mounting wall is formed behind the through hole and a lower mounting wall is formed behind the mounting fixing hole. A fixing member includes an elastic positioning piece and an elastic mounting portion capable of being inserted through the through hole and the mounting fixing hole. An upper mounting projection corresponding to a lower edge of the upper mounting wall and a lower mounting projection corresponding to a lower edge of the lower mounting wall are projecting from the elastic positioning piece. Thereby the upper and lower frame portions are connected securely by the fixing member. During assembly and disassembly processes, no tool is required so that the glasses are more convenient to use.

1 Claim, 8 Drawing Sheets (56) References Cited

U.S. PATENT DOCUMENTS

| | | | |
|---|---|---|---|
| 11,644,686 B2 * | 5/2023 | Tung | G02C 1/02 |
| | | | 351/103 |
| 2017/0219843 A1 * | 8/2017 | Albouy | G02C 5/14 |

FOREIGN PATENT DOCUMENTS

| KR | 20120003775 U | * | 6/2012 | | |
| --- | --- | --- | --- | --- | --- |
| KR | 200473905 Y1 | * | 8/2014 | | |
| KR | 101512593 B1 | * | 4/2015 | | |
| KR | 20160043448 A | * | 4/2016 | | |
| TW | M453159 U | * | 5/2013 | | |
| WO | WO-2014097782 A1 | * | 6/2014 | ............... | G02C 1/02 |
| WO | WO-2020152461 A1 | * | 7/2020 | ............... | G02C 1/02 |

\* cited by examiner

FULL FRAME GLASSES

BACKGROUND OF THE INVENTION

Field of the Invention

The present invention relates to a pair of full frame glasses, especially to a pair of full frame glasses in which assembly and disassembly of lenses are easier, faster, and more convenient without using tools.

Description of Related Art

Generally, there are various types of glasses which are classified into optical glasses, sunglasses, sports glasses, night vision glasses, etc. according to their uses and functions. Thus users can select the glasses they need to wear according to timing and their requirements. Most of consumers now have a plurality of glasses with different functions to meet their requirements. For example, the sports glasses need to have ultraviolet resistance due to strong sunlight in the daytime while allow more light to pass through at night because of dim light at night.

No matter which glasses users pick, the design of the glasses includes lenses held in assembly holes of a frame. By threaded fasteners threaded into screw holes beside the assembly holes of the frame, the lenses are held and fixed in the assembly holes securely.

Although the above structure provides expected stable connection between the lenses and the frame, tools are required for assembly and disassembly of the lenses with the assembly holes while in use. A tool for driving threaded fasteners is turned to make the threaded fasteners tight or loose. Thereby the assembly and disassembly of the lenses are not convenient once users don't have a tool at hand.

Thus there is room for improvement and there is a need to provide novel full frame glasses which address the issues mentioned above.

SUMMARY OF THE INVENTION

Therefore, it is a primary object of the present invention to provide a pair of full frame glasses in which an upper frame portion and a lower frame portion of a frame are connected and holding lenses in the frame firmly. No tool is required during assembly and disassembly of the lenses so that the assembly and disassembly of the lenses are easier, quicker and more convenient.

In order to achieve the above object, a pair of full frame glasses of the present invention mainly include a frame and a fixing member. The frame is composed of an upper frame portion, a lower frame portion, and two lens assembly holes. The upper frame portion and the lower frame portion are connected by outer edges on two sides of both the upper and the lower frame portions while the lens assembly holes are formed between the two sides of the upper and the lower frame portions for mounting two lenses therein. A through hole and a mounting fixing hole corresponding to the through hole are located at a middle part of the upper frame portion and a middle part of the lower frame portion respectively. An upper mounting wall is formed behind of the through hole and a lower mounting wall is formed at the back of the mounting fixing hole.

The fixing member includes an elastic mounting portion projecting from the fixing member and corresponding to the through hole and the mounting fixing hole, and an elastic positioning piece which is extending and projecting from the fixing member and located behind the elastic mounting portion. The elastic mounting portion is inserted through the through hole and the mounting fixing hole. An upper mounting projection corresponding to a lower edge of the upper mounting wall of the upper frame portion is projecting from the elastic positioning piece and used for being locked with and positioned by the lower edge of the upper mounting wall. A lower mounting projection corresponding to a lower edge of the lower mounting wall of the lower frame portion is projecting from the elastic positioning piece and used for being locked with and positioned by the lower edge of the lower mounting wall.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn technical content, purposes and functions of the present invention more clearly and completely, please refer to the following detailed descriptions with the figures and reference signs.

Figure 1:
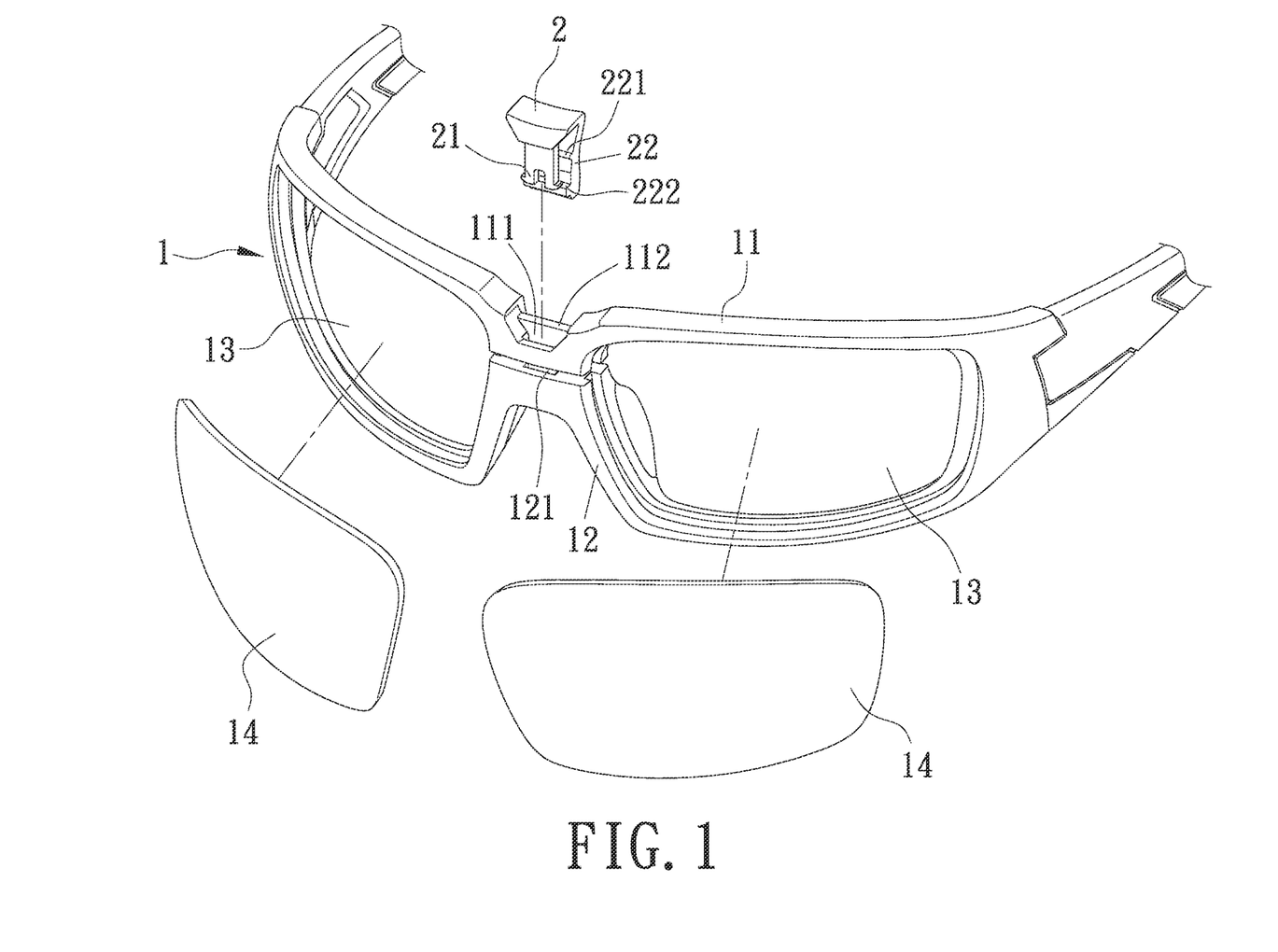
FIG. 1 is an exploded view of an embodiment according to the present invention.
Figure 2:
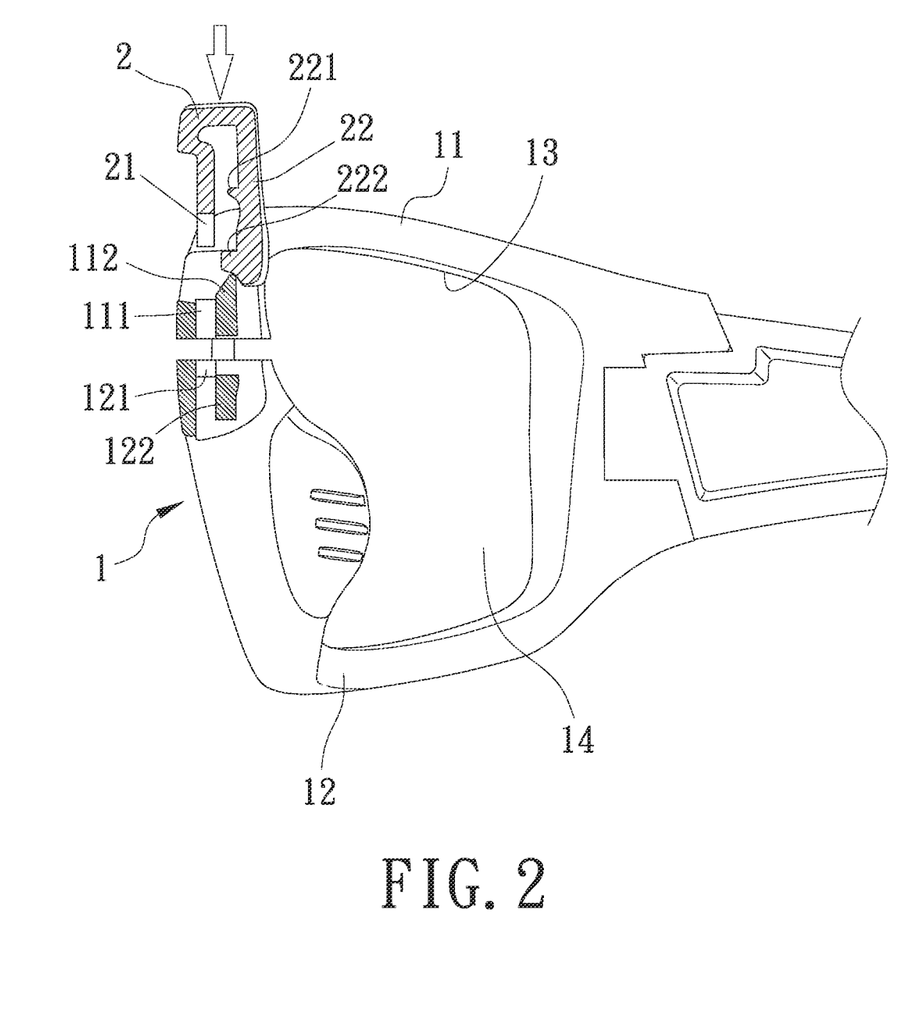
FIG. 2 is an exploded sectional side view of an embodiment according to the present invention.

Refer to FIG. 1 and FIG. 2, a pair of full frame glasses of the present invention mainly include a frame 1 and a fixing member 2.

The frame 1 consists of an upper frame portion 11, a lower frame portion 12, and two lens assembly holes 13. The upper frame portion 11 and the lower frame portion 12 are connected by outer edges on two sides of both the upper and the lower frame portions 11, 12 while the lens assembly holes 13 are formed between the two sides of the upper and the lower frame portions 11, 12 for mounting two lenses 14 therein correspondingly. A through hole 111 is located at and penetrating a middle part of the upper frame portion 11 while an upper mounting wall 112 is formed at the back of the through hole 111. A mounting fixing hole 121 corresponding to the through hole 111 of the upper frame portion 11 is arranged at and penetrating a middle part of the lower frame portion 12 while a lower mounting wall 122 is formed behind the mounting fixing hole 121.

The fixing member 2 is provided with an elastic mounting portion 21 projecting from the fixing member 2 and an elastic positioning piece 22 extending and projecting from the fixing member 2 and located behind the elastic mounting portion 21. The elastic mounting portion 21 is corresponding to and aligned with the through hole 111 and the mounting fixing hole 121 of the frame 1. An upper mounting projection 221 corresponding to a lower edge of the upper mounting wall 112 of the upper frame portion 11 and a lower mounting projection 222 corresponding to a lower edge of the lower mounting wall 122 of the lower frame portion 12 are projecting from the elastic positioning piece 22.

Figure 3:
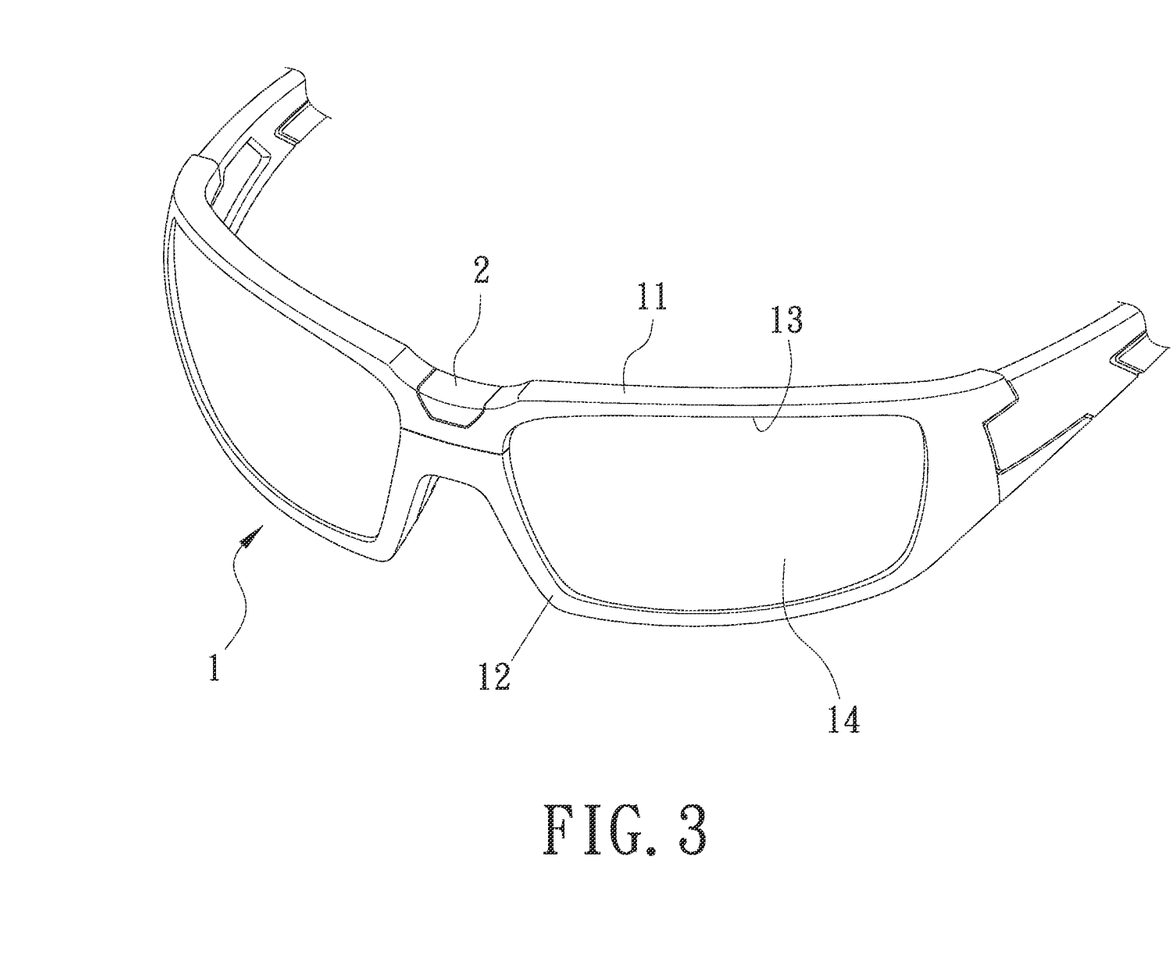
FIG. 3 is a perspective view of an embodiment according to the present invention.
Figure 4:
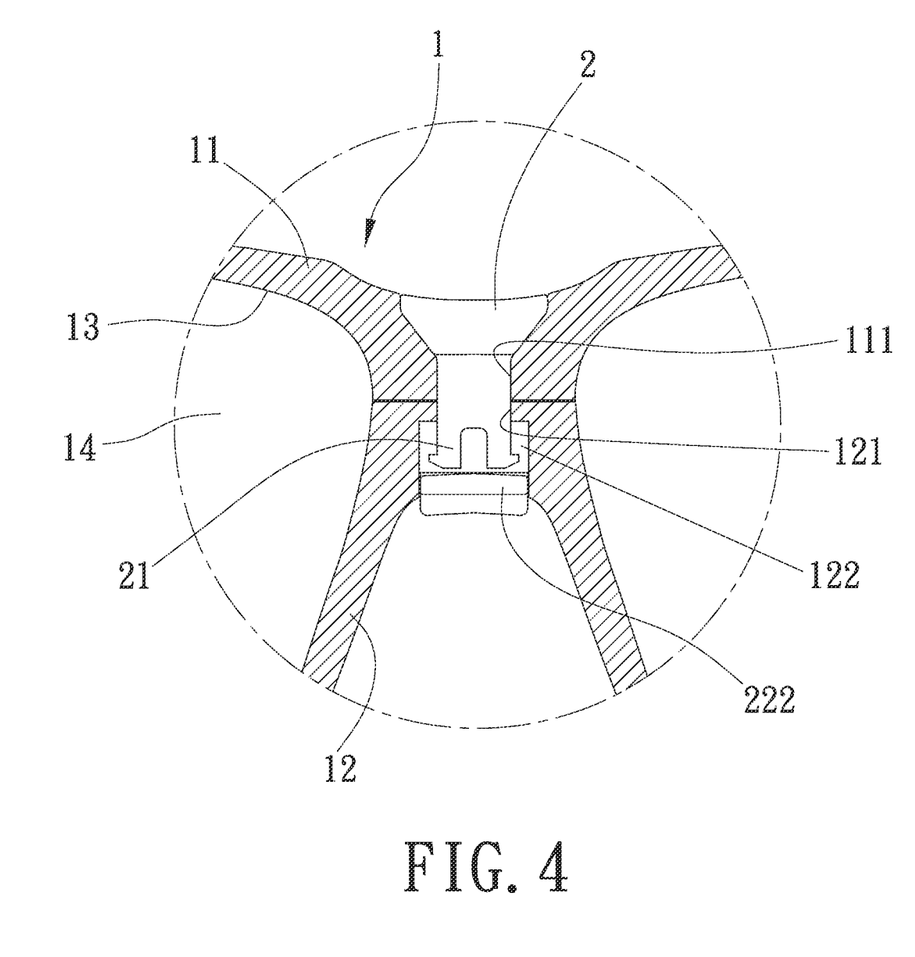
FIG. 4 is a partial front sectional view of an embodiment according to the present invention.
Figure 5:
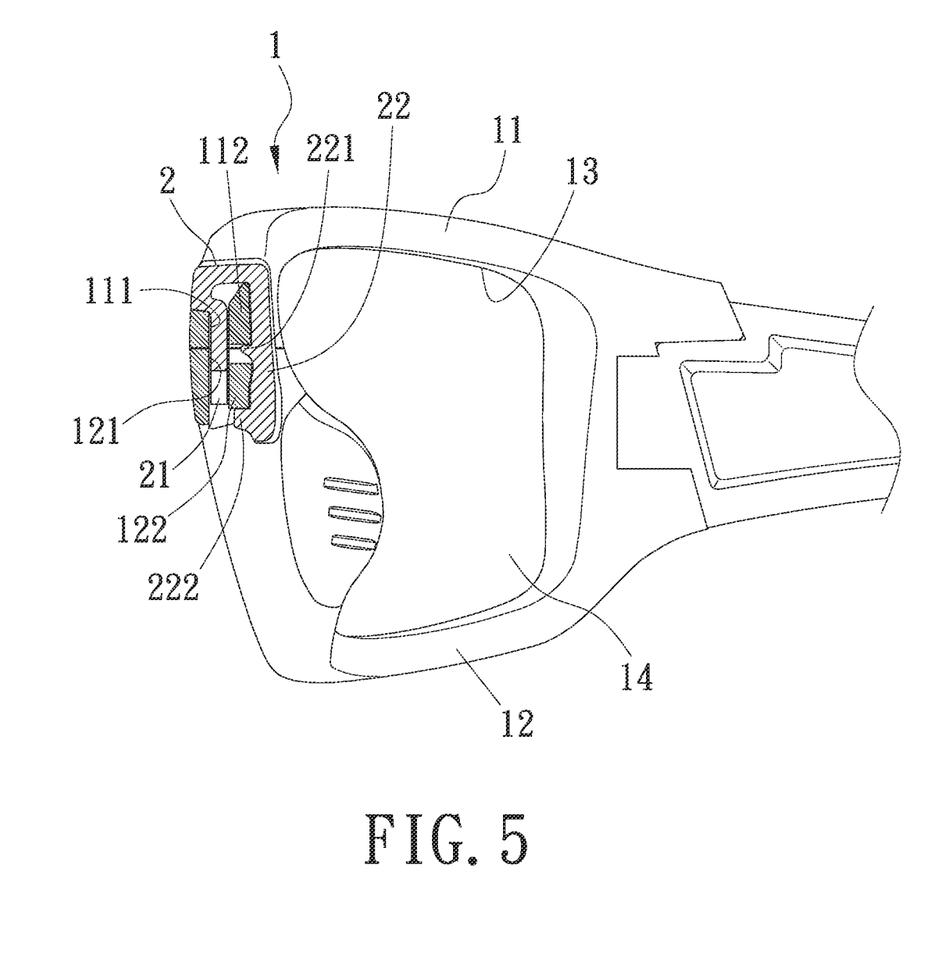
FIG. 5 is a sectional side view of an embodiment according to the present invention.

While being assembled, the lenses 14 are mounted into the lens assembly holes 13 formed between two sides of the upper frame portion 11 and the lower frame portion 12 correspondingly. Then the elastic mounting portion 21 of the fixing member 2 is aligned with and inserted through the through hole 111 of the upper frame portion 11 and the mounting fixing hole 121 of the lower frame portion 12 with a lower part thereof protruding from the mounting fixing hole 121, as shown in FIG. 3 and FIG. 4. Now the elastic positioning piece 22 of the fixing member 2 is attached closely to a rear end of both the upper mounting wall 112 of the upper frame portion 11 and the lower mounting wall 122 of the lower frame portion 12 while the upper mounting projection 221 is locked with and positioned by the lower edge of the upper mounting wall 112 and the lower mounting projection 222 is locked with and positioned by the lower edge of the lower mounting wall 122, as shown in FIG. 5. Thereby the upper and the lower frame portions 11, 12 of the frame 1 are connected and fixed firmly and the lenses 14 securely held and positioned in the lens assembly holes 13 securely, without falling off.

Figure 6:
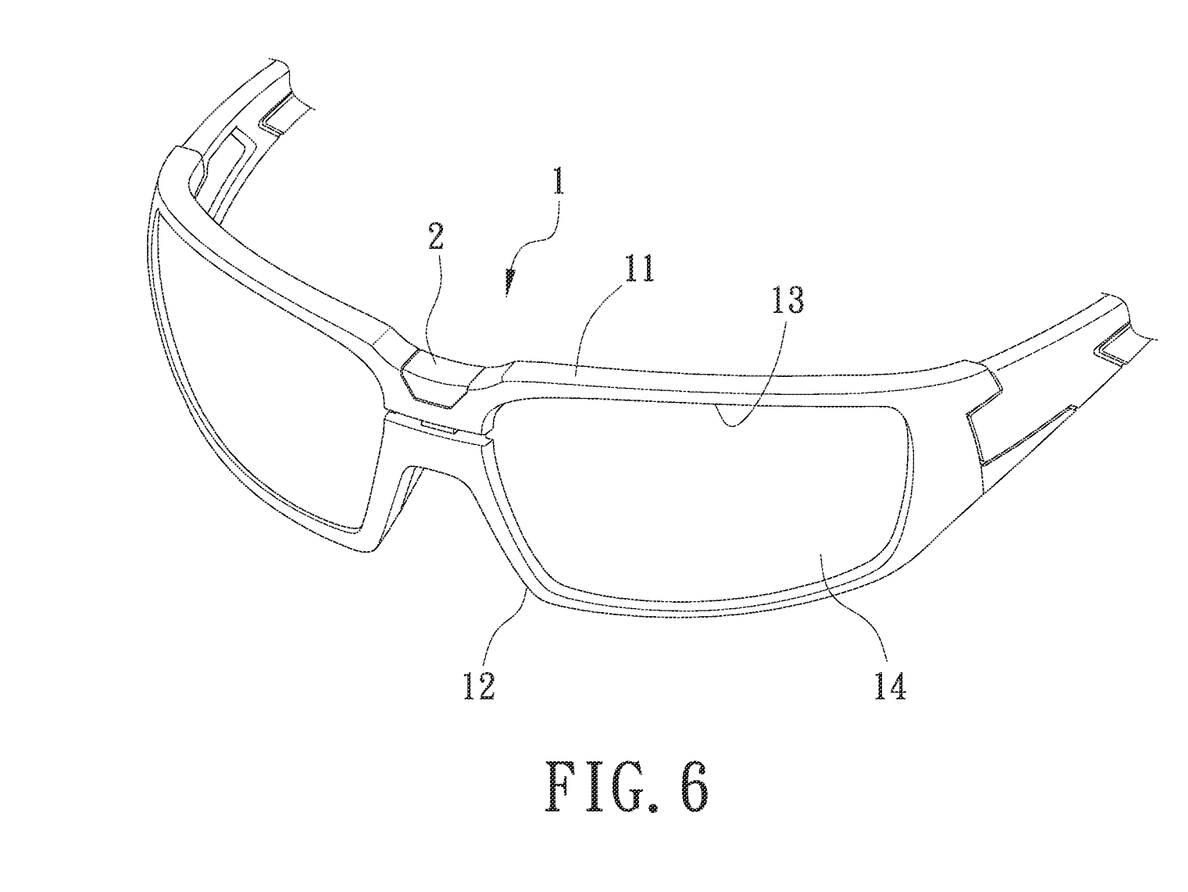
FIG. 6 is a perspective view of an embodiment during replacement of lenses according to the present invention.
Figure 7:
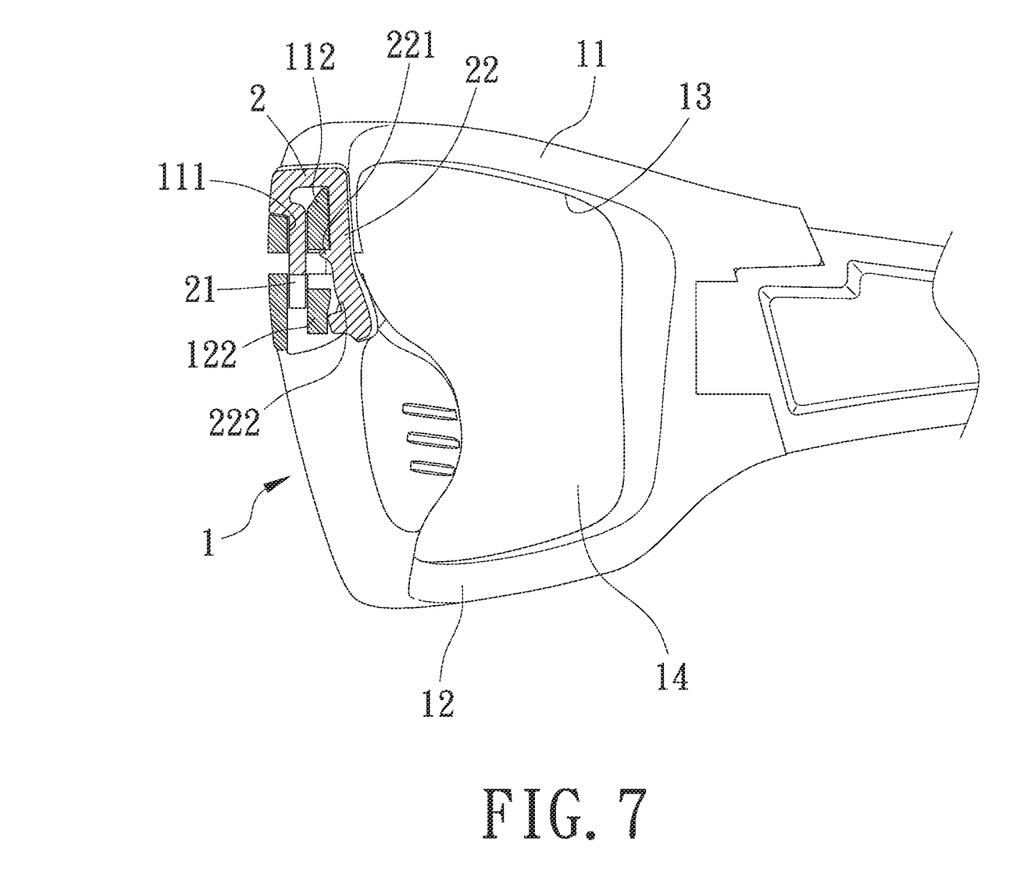
FIG. 7 is a sectional side view of an embodiment during replacement of lenses according to the present invention.
Figure 8:
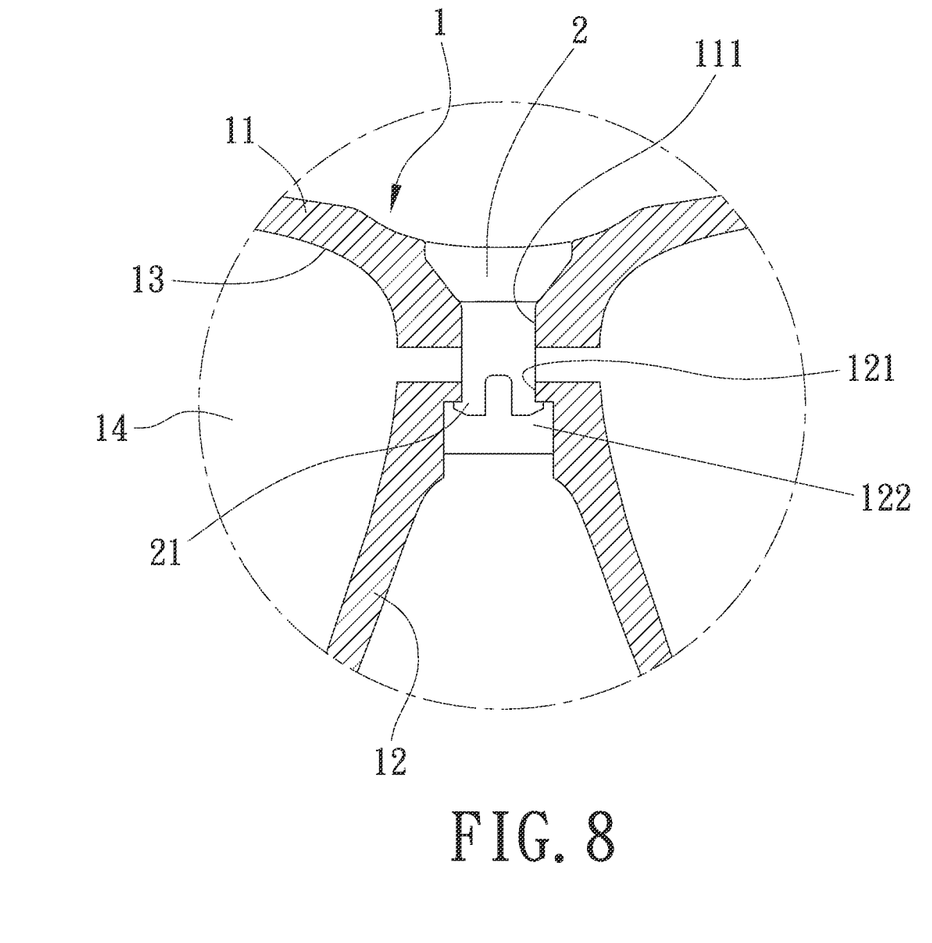
FIG. 8 is a partial front sectional view of an embodiment during replacement of lenses according to the present invention.

Refer to FIG. 6, FIG. 7 and FIG. 8, when users intend to replace the lens 14 in the lens assembly hole 13, they apply a force to pull a lower end of the elastic positioning piece 22 of the fixing member 2 so that the lower mounting projection 222 of the elastic positioning piece 22 is released from the lower edge of the lower mounting wall 122 of the lower frame portion 12. Thus the upper frame portion 11 and the lower frame portion 12 of the frame 1 are able to be separated from each other. While the upper and the lower frame portions 11, 12 being moved away from each other, the elastic mounting portion 21 is just leaning against a lower part of the mounting fixing hole 121 of the lower frame portion 12 to prevent a gap formed between the separated upper and the lower frame portions 11, 12 from becoming too large. Such design not only prevents the lens 14 from getting loose and falling off from the lens assembly hole 13, but also protects the frame 1 from deformation and damages. Thereby the lenses 14 can be replaced. After completing the replacement, the upper frame portion 11 and the lower frame portion 12 are moved toward to and become in contact with each other and then the lower mounting projection 222 is locked with and positioned by the lower mounting wall 122 again. Thus the lenses 14 are held and positioned in the lens assembly holes 13 securely, without falling off.

In summary, compared with techniques available now, the upper frame portion and the lower frame portion hold and fix the lenses firmly by the arrangement of the fixing member in the present glasses. No tool is required during assembly and disassembly of the lenses. Thus the assembly and disassembly of the lenses is easier, quicker and more convenient.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A pair of full frame glasses comprising
   a frame and
   a fixing member;
   wherein the frame includes an upper frame portion, a lower frame portion, and two lens assembly holes; the upper frame portion and the lower frame portion are connected by outer edges on two sides of both the upper and the lower frame portions while the lens assembly holes are formed between the two sides of the upper and the lower frame portions for mounting two lenses therein; wherein a through hole is located at a middle part of the upper frame portion and an upper mounting wall is formed behind the through hole; wherein a mounting fixing hole corresponding to the through hole of the upper frame portion is arranged at a middle part of the lower frame portion and a lower mounting wall is formed behind the mounting fixing hole;
   wherein the fixing member includes an elastic mounting portion projecting from the fixing member and an elastic positioning piece which is extending and projecting from the fixing member and located behind the elastic mounting portion; the elastic mounting portion is aligned with and inserted through the through hole and the mounting fixing hole; wherein an upper mounting projection corresponding to a lower edge of the upper mounting wall of the upper frame portion is projecting from the elastic positioning piece and used for being locked with and positioned by the lower edge of the upper mounting wall; wherein a lower mounting projection corresponding to a lower edge of the lower mounting wall of the lower frame portion is projecting from the elastic positioning piece and used for being locked with and positioned by the lower edge of the lower mounting wall.

\* \* \* \* \*